UNITED STATES PATENT OFFICE.

MYRTIL KAHN, OF ELBERFELD, PRUSSIA, GERMANY.

PROCESS OF MAKING AZO DYES.

SPECIFICATION forming part of Letters Patent No. 425,885, dated April 15, 1890.

Application filed December 26, 1888. Serial No. 294,645. (Specimens.) Patented in Germany October 6, 1888, No. 48,924; in England October 8, 1888, No. 14,442; in France October 10, 1888, No. 193,430; in Spain January 25, 1889, No. 8,939; in Italy March 31, 1889, No. 48/315, and in Austria-Hungary May 17, 1889, No. 46,375 and No. 3,240.

*To all whom it may concern:*

Be it known that I, MYRTIL KAHN, chemist, and a subject of the German Emperor, residing at Elberfeld, Prussia, German Empire, have invented certain new and useful Improvements in the Manufacture of Violet to Blue-Black Azo Dye-Stuffs, (for which I have obtained Letters Patent in Germany, dated October 6, 1888, No. 48,924; in Austria-Hungary, dated May 17, 1889, No. 46,375 and No. 3,240; in Italy, dated March 31, 1889, No. 48/315; in Spain, dated January 25, 1889, No. 8,939; in Great Britain, dated October 8, 1888, No. 14,442, and in France, dated October 10, 1888, No. 193,430;) and I do hereby declare the following to be a full, clear, and exact description of the invention, such as will enable others skilled in the art to which it appertains to make and use the same.

The invention relates to the manufacture of new violet to blue-black azo dye-stuffs for dyeing wool. These dye-stuffs I obtain by combining the diazo compounds of the amidoazo compounds produced by the reaction of alpha-naphthylamine on diazo compounds of the mono, di, or tri sulphonic acids of xylidine and alpha and beta naphthylamine, or those diazo compounds formed by sulphonating the amidoazo compounds of amido-naphthaline, azo-benzol, monosulphonic acid, and such homologues as azo-toluol and azo-xylol monosulphonic acid, with phenylalpha-naphthylamine, and such homologues as alpha-dinaphthylamine, ortho and para tolyl and xylyl alpha-naphthylamine.

The process for manufacturing the new azo dye-stuffs is in general as follows: The diazo compounds of the sulphonic acids of the above-mentioned amines are combined with the theoretical quantity of alpha-naphthylamine. The thus-formed amidoazo compounds are converted, without isolating, in their diazo compounds by adding the theoretical quantity of a solution of sodium nitrite. These new diazo compounds are with great difficulty soluble in water and separate after standing of some hours in fine crystals. They are filtered off and given to an alcoholic solution of the theoretical quantity of phenyl, tolyl, or xylyl alpha-naphthylamine. If the diazo compounds of the amidoazo compounds are too easily soluble—for example, those of the trisulphonic acids—they are salted out. After standing for some time the mixture is heated to 50° and the dye-stuff acid is filtered off and converted in the well-known manner into the coloring-matter.

In the following I give an exact description of the best way to manufacture my new azo dye-stuffs:

*Dye-stuff from paraamid-obenzole disulphonic acid + alpha-naphthylamine + paratolyl-alpha-naphthylamine.*—23.5 kilograms of paraamido-benzole sulphonic acid are converted in the well-known manner into its diazo compounds and the clear solution is poured into a hydrochloric solution of twenty kilograms of alpha-naphthylamine. The amidoazo compound is formed in a short time, and for converting the same into its diazo compounds I add to the deep-red-colored solution a solution of ten kilograms of sodium nitrite in one hundred kilograms of water. After standing for some hours the formation of the diazo compounds is finished and the same, which is totally separated, is filtered off and given into an alcoholic solution of thirty-five kilograms of paratolyl-alpha-naphthylamine. After standing for, perhaps, twenty-four hours the mixture is heated to 50° and the thus-formed dye-stuff acid is separated by filtration.

For manufacturing the dye-stuff the acid is dissolved in sodium carbonate, salted out, filtered off, and dried. The thus-formed dye-stuff dyes wool with a fine deep blue-black color.

The same technical effect as above described can be obtained if the paratolyl-alpha-naphthylamine is substituted by phenyl-alpha-naphthylamine, ortho tolyl-alpha-naphthylamine, dinaphthylamine, ortho and para xylyl-alpha-naphthylamine, and the para amido-benzole disulphonic acid by any sulphonic acid of aniline, toluidine, xylidine, alpha and beta naphthylamine.

Having described my invention, what I claim, and desire to secure by Letters Patent, is—

The herein-described process of producing violet to blue-black azo dyes for dyeing wool, which consists in combining the diazo compounds of the sulpho-acids of aniline or its specified equivalents with alpha-naphthylamine, again diazotizing the amidoazo compounds thus obtained and combining therewith phenyl alpha-naphthylamine or a homologue thereof, as set forth.

In testimony whereof I affix my signature in presence of two witnesses.

MYRTIL KAHN.

Witnesses:
 ANTON KEUTER,
 CONSTANTIN VON MERTSCHINSKY.